(12) United States Patent
Gadkaree et al.

(10) Patent No.: US 9,941,059 B2
(45) Date of Patent: Apr. 10, 2018

(54) LOW RESISTANCE ULTRACAPACITOR ELECTRODE AND MANUFACTURING METHOD THEREOF

(71) Applicant: Corning Incorporated, Corning, NY (US)

(72) Inventors: Kishor Purushottam Gadkaree, Painted Post, NY (US); Rahul Suryakant Kadam, Corning, NY (US); Atul Kumar, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/365,313

(22) Filed: Nov. 30, 2016

(65) Prior Publication Data

US 2017/0084402 A1 Mar. 23, 2017

Related U.S. Application Data

(62) Division of application No. 14/166,494, filed on Jan. 28, 2014, now Pat. No. 9,595,398.

(Continued)

(51) Int. Cl.
*H01G 11/38* (2013.01)
*H01G 11/70* (2013.01)
(Continued)

(52) U.S. Cl.
CPC ............ *H01G 11/38* (2013.01); *H01G 11/28* (2013.01); *H01G 11/34* (2013.01); *H01G 11/70* (2013.01);
(Continued)

(58) Field of Classification Search
None
See application file for complete search history.

(56) References Cited

U.S. PATENT DOCUMENTS 4,666,493 A 5/1987 Frank et al.
4,825,376 A 4/1989 Brinker et al.
(Continued)

FOREIGN PATENT DOCUMENTS

CN 101001658 A 7/2007
CN 101219592 9/2012
(Continued)

OTHER PUBLICATIONS

Feld, "Single Lithium Ion Conducting Polymer Electrolyte", Department of Chemistry, Wright State University Dayton, OH 45435; May 1, 1998.
(Continued)

*Primary Examiner* — Dion R Ferguson
(74) *Attorney, Agent, or Firm* — Matthew A. Doscotch

(57) ABSTRACT

A carbon-based electrode includes activated carbon, carbon black, and a binder. The binder is fluoropolymer having a molecular weight of at least 500,000 and a fluorine content of 40 to 70 wt. %. A method of forming the carbon-based electrode includes providing a binder-less conductive carbon-coated current collector, pre-treating the carbon coating with a sodium napthalenide-based solution, and depositing onto the treated carbon coating a slurry containing activated carbon, carbon black and binder.

8 Claims, 5 Drawing Sheets

Related U.S. Application Data

(60) Provisional application No. 61/872,192, filed on Aug. 30, 2013.

(51) Int. Cl.
  *H01G 11/86* (2013.01)
  *H01G 11/28* (2013.01)
  *H01G 11/34* (2013.01)
  *H01G 11/78* (2013.01)

(52) U.S. Cl.
  CPC .............. *H01G 11/78* (2013.01); *H01G 11/86* (2013.01); *Y02E 60/13* (2013.01); *Y02T 10/7022* (2013.01)

(56) References Cited

U.S. PATENT DOCUMENTS

| | | |
|---|---|---|
| 5,667,916 A | 9/1997 | Ebel |
| 5,843,522 A | 12/1998 | Zanchetta et al. |
| 6,195,251 B1 | 2/2001 | Suhara |
| 6,502,423 B1 | 1/2003 | Ostendarp et al. |
| 7,128,250 B2 | 10/2006 | Luiz |
| 7,207,250 B2 | 4/2007 | Lisec |
| 7,394,648 B2 | 7/2008 | Kondo et al. |
| 7,833,664 B2 | 11/2010 | Fujita et al. |
| 8,241,751 B2 | 8/2012 | Tomamoto et al. |
| 8,456,802 B2 | 6/2013 | Kobayashi |
| 8,497,006 B2 | 7/2013 | Tomamoto |
| 2002/0080553 A1 | 6/2002 | Pekala |
| 2003/0202316 A1 | 10/2003 | Kawasato |
| 2004/0237737 A1 | 12/2004 | Lisec |
| 2010/0180638 A1 | 7/2010 | Bennett et al. |
| 2011/0002086 A1 | 1/2011 | Feaver et al. |
| 2011/0043966 A1 | 2/2011 | Kobayashi |
| 2011/0081575 A1 | 4/2011 | Voelker et al. |
| 2011/0177290 A1 | 7/2011 | Tomamoto et al. |
| 2011/0177325 A1 | 7/2011 | Tomamoto et al. |
| 2011/0177347 A1 | 7/2011 | Tomamoto et al. |
| 2011/0192878 A1 | 8/2011 | Teranishi et al. |
| 2011/0200812 A1 | 8/2011 | Tomamoto et al. |
| 2011/0292569 A1* | 12/2011 | Gadkaree ............... H01G 11/26 361/502 |
| 2011/0311431 A1* | 12/2011 | Ka ...................... C01B 31/0423 423/448 |
| 2012/0134070 A1 | 5/2012 | Gadkaree |
| 2012/0269563 A1 | 10/2012 | Ui |
| 2012/0282530 A1 | 11/2012 | Chiang et al. |
| 2013/0003260 A1 | 1/2013 | Kondou et al. |
| 2013/0170099 A1* | 7/2013 | Lee ........................ H01G 9/042 361/502 |
| 2014/0293507 A1* | 10/2014 | Gadkaree ............. H01G 9/0029 361/502 |
| 2014/0356703 A1 | 12/2014 | Dennes et al. |

FOREIGN PATENT DOCUMENTS

| | | |
|---|---|---|
| CN | 202592154 | 12/2012 |
| EP | 2525377 | 11/2012 |
| JP | 2002305034 A | 10/2002 |
| JP | 2006086148 A | 3/2006 |
| JP | 2009038020 A | 2/2009 |
| JP | 2011233564 A | 11/2011 |
| JP | 2012-023097 | 2/2012 |
| JP | 2012182203 A | 9/2012 |

OTHER PUBLICATIONS

PCT/US2014052824 Search Report of Dec. 5, 2014.
Lei et al., "Reduction of porous carbon / Al contact resistance for an electric double-layer capacitor," Electrochimica Acta 92 (2013) 183-187.
English Translation of JP2016537791 Office Action dated Mar. 7, 2017, Japan Patent Office.
English Translation of CN201480058847.3 First Office Action dated Sep. 21, 2017, China Patent Office.

* cited by examiner

LOW RESISTANCE ULTRACAPACITOR ELECTRODE AND MANUFACTURING METHOD THEREOF

CROSS-REFERENCE TO RELATED APPLICATIONS

This application is a divisional of and claims priority from and the benefit of U.S. application Ser. No. 14/166,494, filed on Jan. 28, 2014, and entitled "LOW RESISTANCE ULTRACAPACITOR ELECTRODE AND MANUFACTURING METHOD THEREOF," which claims the benefit of U.S. Provisional Application Ser. No. 61/872,192, filed on Aug. 30, 2013, and entitled "LOW RESISTANCE ULTRACAPACITOR ELECTRODE AND MANUFACTURING METHOD THEREOF", the content of which is relied upon and incorporated herein by reference in its entirety.

BACKGROUND

Field

The present disclosure relates generally to carbon-based electrodes for energy storage devices, and more specifically to low resistance electrodes that include a high molecular weight fluoropolymer binder and their methods of production.

Technical Background

Energy storage devices such as ultracapacitors may be used in a variety of applications such as where a discrete power pulse is required. Example applications range from cell phones to hybrid vehicles. Ultracapacitors also known as electrochemical double layer capacitors (EDLCs) have emerged as an alternative or compliment to batteries in applications that require high power, long shelf life, and/or long cycle life. Ultracapacitors typically comprise a porous separator and an organic electrolyte sandwiched between a pair of carbon-based electrodes. The energy storage is achieved by separating and storing electrical charge in the electrochemical double layers that are created at the interfaces between the electrodes and the electrolyte. Important characteristics of these devices are the energy density and power density that they can provide, which are both largely determined by the properties of the carbon that is incorporated into the electrodes.

BRIEF SUMMARY

In accordance with embodiments of the present disclosure, carbon-based electrodes such as for incorporation into ultracapacitors or other high power density energy storage devices, include a carbon mat comprising activated carbon, carbon black and a binder. The carbon mat is disposed adjacent to a current collector. The binder can comprise a high molecular weight fluoropolymer having, for example, 40-70 wt. % fluorine. High molecular weight polymers can have a molecular weight of at least 500,000. An example fluoropolymer is Kynar® grade PVDF.

In further related embodiments, a high-purity, thermally-grown carbon layer can be used as an alternative to conductive ink as a conductive layer between the carbon mat and the current collector. A thermally-grown carbon layer is free of a binder. Devices with a binder-free conductive carbon layer have an ESR that is less than similar devices where such a layer is formed from commercially-available conductive inks.

A method for forming carbon-based electrodes includes pre-treating the binder-less (thermally-grown carbon) conductive layer with a sodium napthalenide-based solution. The solution improves adhesion between the carbon mat and the current collector.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
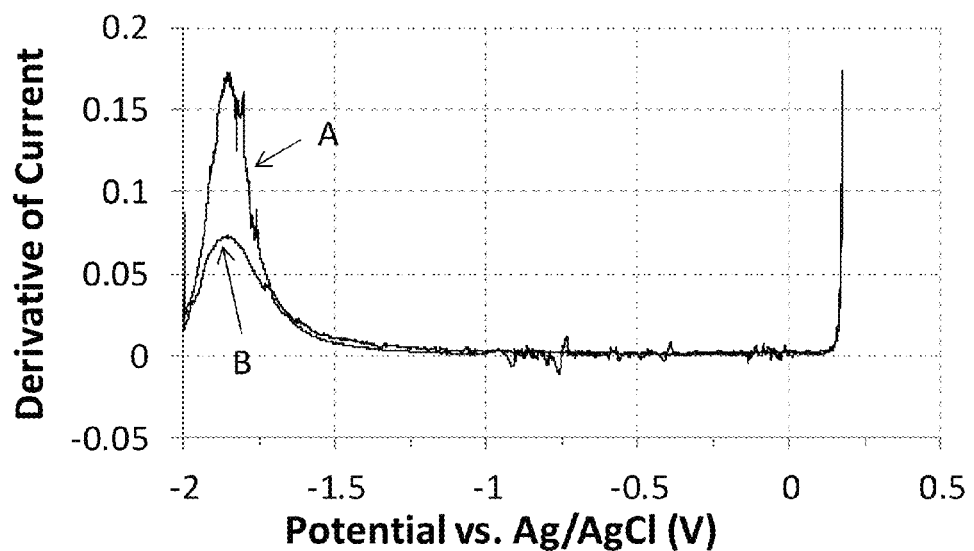
FIG. 1 is a plot of differentiated current versus potential with respect to Ag/AgCl reference electrode for PTFE and PVDF-containing carbon-based electrodes.

Reference will now be made in greater detail to various embodiments of the subject matter of the present disclosure, some embodiments of which are illustrated in the accompanying drawings. The same reference numerals will be used throughout the drawings to refer to the same or similar parts.

Carbon-based electrodes suitable for incorporation into energy storage devices are known. Activated carbon is widely used as a porous material in ultracapacitors due to its large surface area, electronic conductivity, ionic capacitance, chemical stability, and/or low cost. Activated carbon can be made from synthetic precursor materials such as phenolic resins, or natural precursor materials such as coals or biomass. With both synthetic and natural precursors, the activated carbon can be formed by first carbonizing the precursor and then activating the intermediate product. The activation can comprise physical (e.g., steam) or chemical activation (e.g., KOH) at elevated temperatures to increase the porosity and hence the surface area of the carbon. The carbon-based electrodes can include, in addition to activated carbon, a conductive carbon such as carbon black, and a binder such as polytetrafluoroethylene (PTFE). The activated carbon-containing layer (carbon mat) is typically laminated over a current collector to form the carbon-based electrode.

The choice of separator and electrode materials directly affect the performance of the device, including the achievable energy density and power density. The energy density (E) of an EDLC is given by $E=\frac{1}{2} CV^2$, and power density (P) of an EDCL is given by $P=V^2/R$, where C is the capacitance, V is the device's operating voltage, and R is the equivalent series resistance (ESR) of the device.

The ESR has both electronic and an ionic components. The former includes resistance from the carbon-based electrode, including interfacial resistance between the carbon mat and the current collector as well as cell package resistance. The latter is related to the conductivity of electrolyte, and interactions between the electrolyte and the porous carbon.

Recently, with a goal of increasing the energy density and power density of EDLC devices, engineered carbon materials have been developed to achieve higher capacitance. To achieve higher capacitance, activated carbon materials with high surface area (500-2500 m$^2$/g)) may be used.

A further approach to increasing the energy density and power density is to increase the capacitor's operating voltage. In this regard, aqueous electrolytes have been used in EDLCs for lower voltage (<1V) operation, while organic electrolytes have been used for higher voltage (2.3-2.7 V) devices. However, to achieve even higher energy densities, there is a need to increase the voltage envelop from conventional values of about 2.7 V to around 3.0 V. Such an increase from 2.7 to 3.0 V will result in a 23% increase in the energy density. A still further approach to increasing the power density is to minimize the capacitor's ESR.

Thus, in order to realize higher energy densities and higher power densities, next generation EDLCs will likely operate at high applied voltages. As a consequence, it may be desirable to minimize unwanted Faradaic reactions between the binder and the liquid electrolyte, particularly at the higher potentials and reduce the device's ESR by optimizing the interfacial resistance between the carbon mat and the current collector.

In various embodiments, a carbon-based electrode includes activated carbon, carbon black and a binder. The carbon-based electrode can include 75-90 wt. % activated carbon, 5-10 wt. % carbon black, and 5-15 wt. % binder. It has been shown that the choice of binder may influence the stability of the electrode when incorporated into an EDLC, particularly at operating voltages greater than 2.7V. Suitable binder materials for forming the carbon-based electrode are high molecular weight fluoropolymers.

High molecular weight fluoropolymer binder materials can have a molecular weight of at least 500,000, e.g., at least 800,000, and can comprise from 40 to 70 wt. % fluorine (e.g., from 50-70 wt. % fluorine). An example fluoropolymer is polyvinylidene fluoride (PVDF).

PVDF has a glass transition temperature ($T_g$) of about −35° C. and is typically 50-60% crystalline. PVDF may be synthesized from the gaseous VDF monomer via a free radical (or controlled radical) polymerization process. PVDF is marketed under a variety of brand names including Hylar (Solvay), Kynar (Arkema) and Solef (Solvay).

In embodiments, the PVDF incorporated as a binder into a carbon-based electrode has a molecular weight of at least 500,000 (e.g., at least 800,000). PVDF is an alternative to PTFE, which is widely used as a binder material in carbon-based electrodes. PVDF-containing electrodes have been shown to be more stable than PTFE-containing electrodes in example EDLC devices, however, particularly at operating voltages greater than 2.7V (i.e., greater than 3V).

The stability of negative electrodes comprising different binders was evaluated using a three electrode setup, which involved polarizing the electrodes to extreme potentials with respect to a Ag/AgCl reference electrode. As shown in FIG. 1, the electrode comprising a comparative PTFE binder (curve A) exhibits a high reduction current at about −1.8V. Without wishing to be bound by theory, this current is believed to be due to reductive decomposition of PTFE through de-fluorination. PTFE de-fluorination is believed to weaken the negative electrode matrix and lead to electrode embrittlement. Such embrittlement has been observed experimentally. It is also believed that fluorine from PTFE may react with trace moisture and generate unwanted HF acid within the cell. Additionally, the highly irreversible reduction reaction causes the potential of the positive electrode to be shifted unfavorably into a region of irreversible oxidation, further degrading the cell.

In contrast, still referring to FIG. 1, the negative electrode comprising PVDF binder (curve B) exhibits a lesser reduction current at about −1.8V, consistent with the conclusion that PVDF is less prone to voltage-induced degradation. Without wishing to be bound by theory, the lower relative fluorine content of PVDF may account for its enhanced high-voltage stability compared to PTFE. PVDF, which has the generalized formula $(CH_2CF_2)_n$, includes half the fluorine of PTFE, which has the structural unit $(C_2F_4)_n$. Compositionally, PVDF is about 59 wt. % fluorine, while PTFE is about 76 wt. % fluorine. A further example fluoropolymer is $(CHFCF_2)_n$, which is about 69.5 wt. % fluorine.

Various methods can be used to form a carbon-based electrode (e.g., carbon mat) that includes a high molecular weight fluoropolymer binder. One method of making a carbon-based electrode includes forming a slurry comprising activated carbon, carbon black, binder and a liquid carrier. A carbon mat can be formed by coating a substrate with the slurry and drying the coating to remove the liquid carrier.

The liquid carrier may be isopropyl alcohol, n-methyl pyrrolidone (NMP), dimethyl formamide (DMF), dimethyl acetamide (DMAc), etc. which can facilitate adhesion of the component particles during processing as well as the formation of a thin film of the components via casting. PVDF, for example, is soluble in NMP. A slurry comprising activated carbon, carbon black and PVDF binder in NMP can therefore include solid particles of the activated carbon and carbon black, while the PVDF will be in solution until the solvent is removed.

In various embodiments, a slurry comprising activated carbon, carbon black, binder and a liquid carrier or liquid solvent can be deposited (e.g., slot coated) onto a substrate to form a thin film that is dried to produce a carbon mat. The thin film can be dried, for example, in a conventional oven or in a vacuum oven. The substrate may be a current collector such that the carbon-based electrode is formed in situ. The current collector may include a conductive carbon layer onto which the slurry is deposited.

To improve the mechanical integrity of the carbon mat/current collector composite, the deposited thin film can be laminated onto the current collector, which compacts the layers. The application of pressure may be performed at elevated temperature, e.g., about 200° C. The laminated electrodes may be cut to the appropriate dimensions and wound into a jelly roll together with cellulosic separator paper (NKK TF4030). The current collector ends are smeared and laser welded to terminals. The assembly is then packaged into an aluminum can and sealed. The resulting cell is dried in vacuum at 130° C. for 48 hrs. Electrolyte is filled into the cell, and the cell is sealed.

In embodiments, the carbon mat is laminated onto one or both sides of a conductive current collector. The current collector can be, for example, a 15-40 μm (e.g., 20 micron) thick aluminum foil that is optionally pre-coated with a layer of conductive carbon such as thermally-grown carbon. With respect to commercially-available conductive inks, thermally-grown carbon may contain fewer transition metal contaminants, which can aid in minimizing unwanted Faradic reactions and reducing the ESR. The thermally-grown carbon layer, which is free of a binder, may also promote a low ESR through the current collector via the formation of electrically conductive aluminum carbide ($Al_4C_3$) particles at the interface between the carbon layer and the aluminum. The layer of conductive carbon can be free or substantially free of organics, such that, in embodiments, the organic content of the conductive carbon layer is less than 1 wt. % or less than 0.5 wt. %. For example, the organic content of the conductive carbon layer can range from 100 ppm to 10000 ppm, e.g., 100, 200, 500, 1000, 5000 or 10000 ppm, including ranges between any of the foregoing values.

Figure 2:
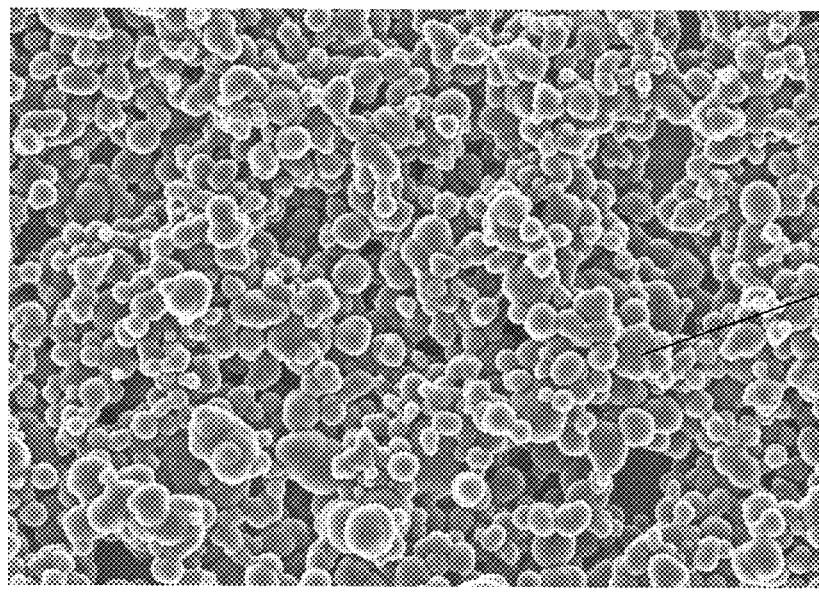
FIG. 2 shows a plan-view SEM micrograph of a thermally-grown carbon layer.
Figure 3:
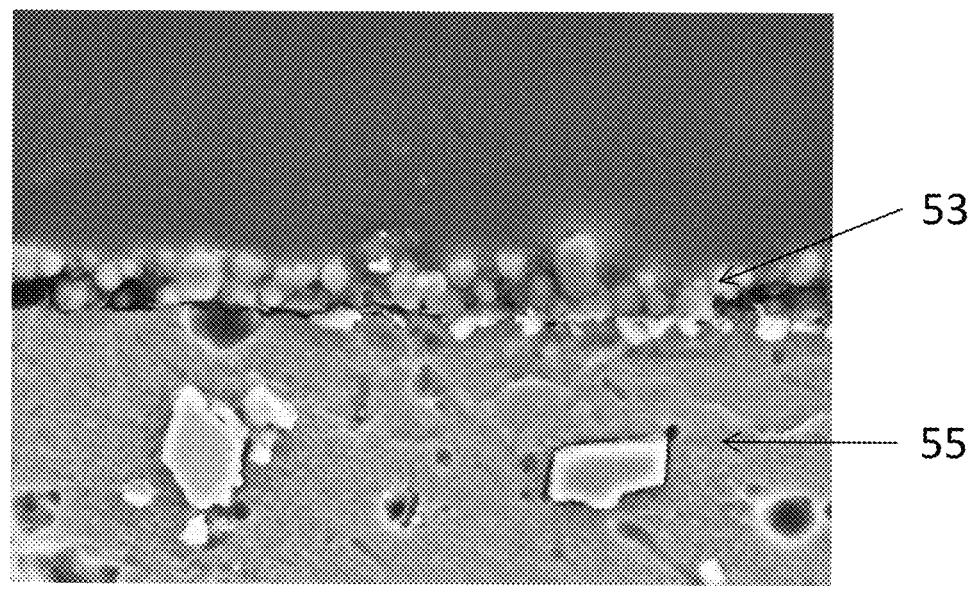
FIG. 3 shows a cross-sectional SEM micrograph of a thermally-grown carbon layer on an aluminum current collector.

Scanning electron microscope (SEM) micrographs of a thermally-grown carbon layer 53 disposed over an aluminum current collector 55 are shown in FIG. 2 (plan view) and FIG. 3 (cross-sectional view).

Notwithstanding a step of lamination, adhesion of the carbon mat to the current collector can be improved by pre-treating the current collector surface. Such a pre-treatment may include etching the surface (e.g., etching the binder-less carbon surface) prior to applying or forming the carbon mat. Another approach includes applying an etchant to the carbon mat.

The use of an etchant significantly improves the adhesion of the carbon mat with the binder-less carbon-coated aluminum current collector. One example etchant is a solution of sodium napthalenide in 2-methoxyethyl ether, though other alkali metal napthalenides can be used. For example, further etchants include lithium napthalenide and potassium napthalenide.

Fluoropolymer binders such PVDF are made up of carbon atoms, hydrogen atoms and fluorine atoms. A sodium napthalenide-based etchant contains metallic sodium in solution. The sodium reacts with the fluorine of the fluoropolymer, extracting it, which leaves the molecule unbalanced. During subsequent exposure to ambient conditions, hydrogen and oxygen atoms restore the equilibrium of the molecule. This results in a carbonaceous backbone rich in functional groups that are responsible for adhesion.

Figure 4:
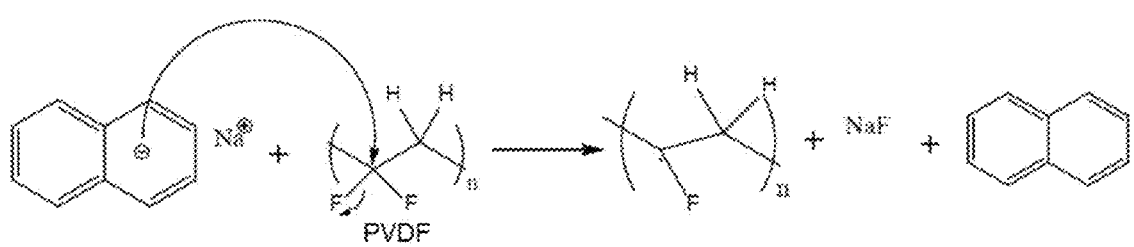
FIG. 4 is a schematic representation of the reaction between sodium napthalenide and PVDF.

A schematic representation of the reaction between sodium napthalenide and PVDF is shown in FIG. 4. The by-products of the reaction are sodium fluoride (NaF) and naphthalene.

In an example method, an etchant is prepared for conditioning the binder-less carbon coated current collector. Sodium napthalenide solution in 2-methoxyethyl ether is the base material for the process. Such a solution may be obtained at a concentration of 10-30 wt. % sodium napthalenide, which may be further diluted, for example, by the addition of tetrahydrofuran (THF) to yield a 2-5 wt. % solution of sodium napthalenide/2-methoxyethyl ether in THF.

The etchant solution can be coated onto the binder-less carbon coated current collector using a variety of methods such as spray coating, slot coating or gravure roll coating. The sodium napthalenide solution can be allowed to dry. Electrode slurry comprising activated carbon, carbon black and binder can in turn be coated onto the treated binder-less carbon coated current collector, dried and passed through a pair of lamination rollers to form a low ESR carbon-based electrode.

The present disclosure also relates to an energy storage device, such as an electrochemical double layer capacitor (EDLC), comprising at least one carbon-based electrode that includes the high molecular weight PVDF binder material described herein. Such a device can also include a binder-less conductive carbon layer within the carbon-based electrode, i.e., at the interface between the carbon mat and the aluminum current collector.

Ultracapacitors typically comprise two porous electrodes that are isolated from electrical contact with each other by a porous dielectric separator. The separator and the electrodes are impregnated with an electrolytic solution that allows ionic current to flow between the electrodes while preventing electronic current from discharging the cell. Each porous electrode is typically in electrical contact with a current collector. The current collector, which can comprise a sheet or plate of electrically-conductive material (e.g., aluminum) can reduce ohmic losses while providing physical support for the porous electrode (activated carbon) material, i.e., the carbon mat.

According to embodiments, an electrochemical cell comprises a first carbon-based electrode and a second carbon-based electrode arranged within a casing, wherein each carbon-based electrode includes a current collector having opposing first and second major surfaces, a first conductive layer is disposed adjacent to the first major surface, a second conductive layer is disposed adjacent to the second major surface, and a first carbon-based layer and a second carbon-based layer each comprising activated carbon, carbon black and binder are disposed adjacent to respective ones of the first and second conductive layers. One or both of the conductive layers can comprise a thermally-grown (binder-less) carbon layer.

Figure 5:
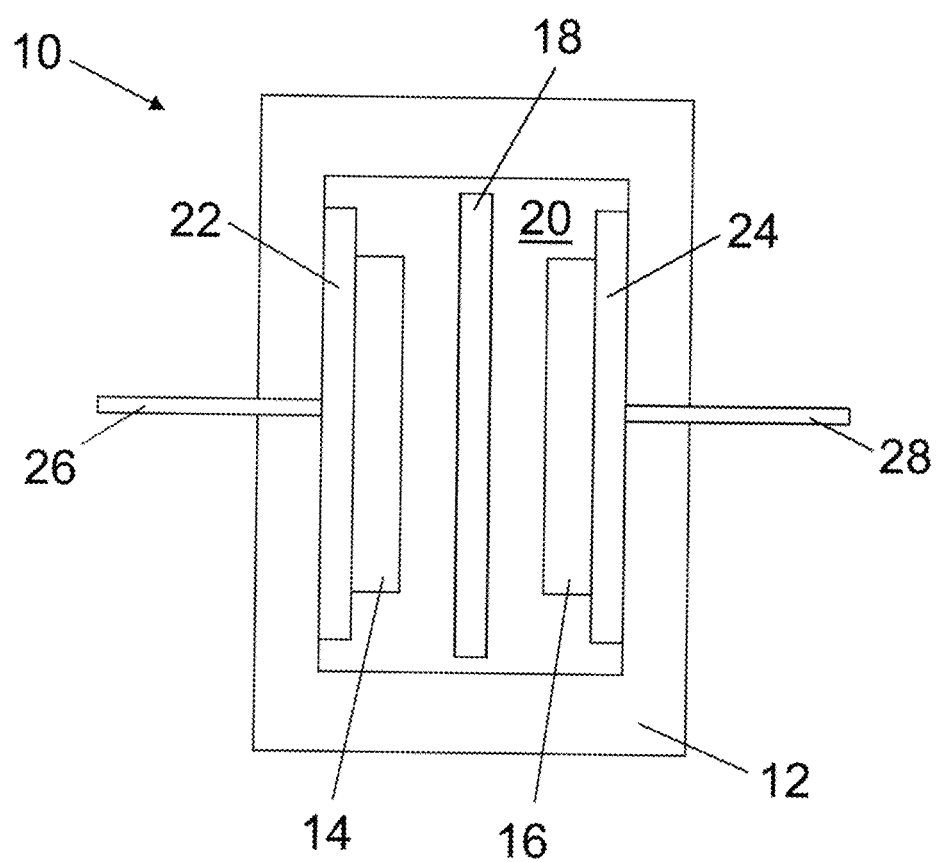
FIG. 5 is a schematic illustration of an example ultracapacitor.

FIG. 5 is a schematic illustration of an example ultracapacitor. Ultracapacitor 10 includes an enclosing body 12, a pair of current collectors 22, 24, a first carbon mat 14 and a second carbon mat 16 each respectively disposed adjacent to one of the current collectors, and a porous separator layer 18. Electrical leads 26, 28 can be connected to respective current collectors 22, 24 to provide electrical contact to an external device. Layers 14, 16 may comprise activated carbon, carbon black and high molecular weight fluoropolymer binder. A liquid electrolyte 20 is contained within the enclosing body and incorporated throughout the porosity of both the porous separator layer and each of the porous electrodes. In embodiments, individual ultracapacitor cells can be stacked (e.g., in series) to increase the overall operating voltage.

The enclosing body 12 can be any known enclosure means commonly-used with ultracapacitors. The current collectors 22, 24 generally comprise an electrically-conductive material such as a metal, and commonly are made of aluminum due to its electrical conductivity and relative cost. For example, current collectors 22, 24 may be thin sheets of aluminum foil.

Porous separator 18 electronically insulates the electrodes from each other while allowing ion diffusion. The porous separator can be made of a dielectric material such as cellulosic materials, glass, and inorganic or organic polymers such as polypropylene, polyesters or polyolefins. In embodiments, a thickness of the separator layer can range from about 10 to 250 microns.

The electrolyte 20 serves as a promoter of ion conductivity, as a source of ions, and may serve as a binder for the carbon. The electrolyte typically comprises a salt dissolved in a suitable solvent. Suitable electrolyte salts include quaternary ammonium salts such as those disclosed in commonly-owned U.S. patent application Ser. No. 13/682,211, the disclosure of which is incorporated herein by reference. Example quaternary ammonium salts include tetraethylammonium tetraflouroborate $((Et)_4NBF_4)$ or triethylmethyl ammonium tetraflouroborate $(Me(Et)_3NBF_4)$.

Example solvents for the electrolyte include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. In embodiments, the electrolyte includes a polar aprotic organic solvent such as a cyclic ester, chain carbonate, cyclic carbonate, chain ether and/or cyclic ether solvent. Example cyclic esters and chain carbonates have from 3 to 8 carbon atoms, and in the case of the cyclic esters include β-butyro-lactone, γ-butyrolactone, γ-valerolactone and δ-valerolactone. Examples of the chain carbonates include dimethyl carbonate, diethyl carbonate, dipropyl carbonate, ethylene carbonate, methyl ethyl carbonate, methyl propyl carbonate and ethyl propyl carbonate. Cyclic carbonates can have from 5 to 8 carbon atoms, and examples include 1,2-butylene carbonate, 2,3-butylene carbonate, 1,2-pentene carbonate, 2,3-pentene carbonate and propylene carbonate. Chain ethers can have 4 to 8 carbon atoms. Example chain ethers include dimethoxyethane, diethoxyethane, methoxyethoxyethane, dibutoxyethane, dimethoxypropane, diethoxypropane and methoxyethoxypropnane. Cyclic ethers can have from 3 to 8 carbon atoms. Example cyclic ethers include tetrahydofuran, 2-methyl-tetrahydrofuran, 1,3-dioxolan, 1,2-dioxolan, 2-methyldioxolan and 4-methyldioxolan. A combination of two or more solvents may also be used.

As examples, an assembled EDLC can comprise an organic liquid electrolyte such as tetraethylammonium tetrafluoroborate (TEA-TFB) or triethylmethylammonium tetrafluoroborate (TEMA-TFB) dissolved in an aprotic solvent such as acetonitrile.

Ultracapacitors may have a jelly roll design, prismatic design, honeycomb design, or other suitable configuration. A carbon-based electrode made according to the present disclosure can be incorporated into a carbon-carbon ultracapacitor or into a hybrid ultracapacitor. In a carbon-carbon ultracapacitor, both of the electrodes are carbon-based electrodes. In a hybrid ultracapacitor, one of the electrodes is carbon-based, and the other electrode can be a pseudo capacitive material such as lead oxide, ruthenium oxide, nickel hydroxide, or another material such as a conductive polymer (e.g., parafluorophenyl-thiophene).

In carbon-carbon ultracapacitors, the activated carbon in each electrode may have the same, similar or distinct properties. For example, the pore size distribution of the activated carbon incorporated into a positive electrode may be different than the pore size distribution of the activated carbon incorporated into a negative electrode.

The activated carbon used in conjunction with the carbon-based electrodes disclosed herein can have a specific surface area greater than about 300 $m^2/g$, i.e., greater than 350, 400, 500 or 1000 $m^2/g$. In embodiments, the average particle size of the activated carbon can be milled to less than 20 microns, e.g., about 5 microns, prior to incorporating the activated carbon into a carbon-based electrode.

Within an individual ultracapacitor cell, and under the influence of an applied electric potential, an ionic current flows due to the attraction of anions in the electrolyte to the positive electrode and cations to the negative electrode. Ionic charge can accumulate at each of the electrode surfaces to create charge layers at the solid-liquid interfaces. The accumulated charge is held at the respective interfaces by opposite charges in the solid electrode to generate an electrode potential.

During discharge of the cell, a potential across the electrodes causes ionic current to flow as anions are discharged from the surface of the positive electrode and cations are discharged from the surface of the negative electrode. Simultaneously, an electronic current can flow through an external circuit located between the current collectors. The external circuit can be used to power electrical devices.

The amount of charge stored in the layers impacts the achievable energy density and power density of the capacitor. The performance (energy and power density) of an ultracapacitor depends largely on the properties of the activated carbon that makes up the electrodes. The properties of the activated carbon, in turn, can be gauged by evaluating, for example, the porosity and pore size distribution of the activated carbon, as well as the impurity content within the activated carbon, such as nitrogen or oxygen. Relevant electrical properties include the potential window, area-specific resistance and the volumetric capacitance.

The disclosed ultracapacitors may, in some embodiments, exhibit operating voltages up to 3.2 V (e.g., 2.7, 2.8, 2.9, 3.0, 3.1 or 3.2V) and a volumetric capacitance of greater than 50 $F/cm^3$ (e.g., greater than 50, 60, 70, or 80 $F/cm^3$), including capacitance values between any of the foregoing values. The high potential window is believed to be the result of the high purity conductive carbon layer and/or the low reactivity of the binder, e.g., PVDF.

Various embodiments will be further clarified by the following examples.

EXAMPLES

Example 1: PVDF Electrode+Binder-Less Carbon Conductive Layer

Carbon-based electrodes were fabricated with Kynar® 761 PVDF homopolymer as the binder. The molecular weight of the 761 PVDF is in the range of 300,000 to 400,000. The electrodes were cast onto a current collector substrate using a slurry method.

A dry mixture of the carbon-based electrode constituents was initially prepared, including 90 wt. % activated carbon, 5 wt. % carbon black (Cabot BP2000), and 5% Kynar® 761 PVDF. The activated carbon was a chemically-activated carbon derived from wheat flour. The solid mixture was ball milled for 30 min at 350 rpm.

NMP solvent was added to the ball-milled mixture and the resulting slurry was ball-milled again for 30 minutes at 350 rpm. The slurry was applied using a doctor blade directly onto a 20 micron thick aluminum current collector provided with a binder-less carbon conductive layer (TOYO Corporation, Tokyo Japan). The carbon mat thickness was about 100 μm.

The coated current collector was dried at 140-150° C. under vacuum, and then laminated at 140-150° C. to obtain the carbon-based electrode. Adhesion of the carbon mat to the current collector was evaluated using a tape test. The results indicated poor adhesion of the carbon mat to the current collector.

Example 2: PVDF Electrode+Binder-Less Carbon Conductive Layer

Carbon-based electrodes were fabricated with Kynar® 301F PVDF homopolymer as the binder using the process described in Example 1. The molecular weight of the 301F PVDF is in the range of 500,000 to 700,000. Tape test results indicated moderate adhesion of the carbon mat to the current collector.

Example 3: PVDF Electrode+Binder-Less Carbon Conductive Layer

Carbon-based electrodes were fabricated with Kynar® HSV 900 PVDF homopolymer as the binder using the process described in Example 1, except that the thickness of the carbon mat was about 133 μm. The molecular weight of the HSV 900 PVDF is about 1,000,000. Tape test results indicated moderate adhesion of the carbon mat to the current collector.

Examples 1-3 demonstrate that by increasing the molecular weight of the PVDF polymer to at least 500,000, which corresponds to effectively decreasing the glass transition temperature ($T_g$) of the binder, a more mechanically robust carbon-based electrode can be produced. In embodiments, the molecular weight of the PVDF polymer is at least 800,000. Such electrodes are well-suited to forming EDLCs have a jelly-roll design. A summary of the results from Examples 1-3 are shown in Table 1.

TABLE 1

Carbon-based electrodes with different grades of PVDF binder

| Ex. # | PVDF | MW | t (microns) | Adhesion |
|---|---|---|---|---|
| 1 | Kynar ® 761 | 300,000-400,000 | 100 | Poor |
| 2 | Kynar ® 301F | 500,000-700,000 | 100 | Moderate |
| 3 | Kynar ® HSV900 | Approx. 1,000,000 | 133 | Moderate |

Example 4: PTFE Electrode+Ink-Coated Conductive Layer

Comparative carbon-based electrodes were fabricated on conductive carbon ink-coated aluminum foil current collectors using PTFE as the binder.

A solid mixture of 85 wt. % activated carbon, 5 wt. % carbon black, and 10 wt. % PTFE binder (DuPont 601A) was ball-milled for 30 minutes at 350 rpm, and then calendared to obtain a 105 micron thick free-standing carbon mat.

The carbon mat was laminated onto an aluminum foil current collector provided with an ink-based (DAG EB012, Henkel), binder-containing conductive carbon coating. The DAG ink includes a vinyl pyrrolidone polymer binder. Tape test results indicated good adhesion of the carbon mat to the current collector.

Dried electrodes were incorporated into coin cells for ESR measurements. The measured ESR was at 2.3Ω at 3.0 V. The high ESR value was attributed to the binder-containing conductive carbon layer.

Example 5: PVDF Electrode+Un-Etched Binder-Less Carbon Conductive Layer

Carbon-based electrodes were fabricated with Kynar® HSV 900 PVDF homopolymer as the binder. The carbon mat was deposited using a slurry casting method similar to that used in Example 1, but to achieve a 97 μm thick carbon mat. The slurry was applied using a doctor blade directly onto a current collector provided with a binder-less, thermally-grown conductive layer (TOYO Corporation, Tokyo, Japan).

With respect to commercially-available conductive inks, thermally-grown carbon may contain fewer transition metal contaminants, which can aid in minimizing unwanted Faradic reactions.

Following lamination, tape test results indicated moderate adhesion of the carbon mat to the current collector. Dried electrodes were incorporated into coin cells for ESR measurements. The measured ESR was at 0.453Ω at 3.0 V.

Example 6: PVDF Electrode+1% Etched Binder-Less Carbon Conductive Layer

Carbon-based electrodes were fabricated with Kynar® HSV 900 PVDF homopolymer as the binder. The carbon mat was deposited using a slurry cast method similar to that used in Example 1, but to achieve a 97 μm thick carbon mat.

Prior to lamination, the binder-less carbon coated current collector was etched using a 1% solution of Na-napthalenide/2-methoxyethyl ether in THF. The solution was spray coated onto the conductive carbon, which was dried for 10-15 seconds.

Tape test was performed and complete delamination of the carbon layer from binder-less carbon coated current collector was observed. ESR data was not obtainable for Example 6 due to the poor adhesion of the carbon mat.

Example 7: PVDF Electrode+2% Etched Binder-Less Carbon Conductive Layer

Carbon-based electrode were fabricated as in Example 6, except the binder-less carbon coated current collector was etched using a 2% Na-napthalenide/2-methoxyethyl ether solution in THF.

Tape test results indicated good adhesion of the carbon mat to the current collector. The measured ESR of the corresponding coin cells was 0.735Ω at 3.0 V.

Example 8: PVDF Electrode+5% Etched Binder-Less Carbon Conductive Layer

Carbon-based electrode were fabricated as in Example 6, except the binder-less carbon coated current collector was etched using a 5% Na-napthalenide/2-methoxyethyl ether solution in THF.

Tape test results indicated good adhesion of the carbon mat to the current collector. The measured ESR of the corresponding coin cells was 0.589Ω at 3.0 V.

Example 9: PVDF Electrode+7.5% Etched Binder-Less Carbon Conductive Layer

Carbon-based electrode were fabricated as in Example 6, except the binder-less carbon coated current collector was etched using a 7.5% Na-napthalenide/2-methoxyethyl ether solution in THF.

Tape test results indicated good adhesion of the carbon mat to the current collector. The measured ESR of the corresponding coin cells was 1.042Ω at 3.0 V.

Examples 5-9 examine the effects of pre-treating a thermally-grown conductive carbon layer with sodium napthalenide-based etchant prior to lamination of the current collector with a PVDF-based carbon mat.

A summary of the results from Examples 4-9 are shown in Table 2. The ESR values are reported in Ohms (Ω).

| Ex. # | Cell | Etchant | Adhesion | ESR@0 V | ESR@2.7 V | ESR@3 V |
|---|---|---|---|---|---|---|
| 4 | 10% PTFE + ink | n/a | Good | 0.910 | 1.814 | 2.328 |
| 5 | 5% PVDF + thermal carbon | n/a | Moderate | 0.376 | 0.438 | 0.453 |
| 6 | 5% PVDF + thermal carbon | 1% solution | Poor | n/a | n/a | n/a |
| 7 | 5% PVDF + thermal carbon | 2% solution | Good | 0.572 | 0.655 | 0.735 |
| 8 | 5% PVDF + thermal carbon | 5% solution | Good | 0.528 | 0.535 | 0.589 |
| 9 | 5% PVDF + thermal carbon | 7.5% solution | Good | 0.771 | 0.921 | 1.042 |

Figure 6:
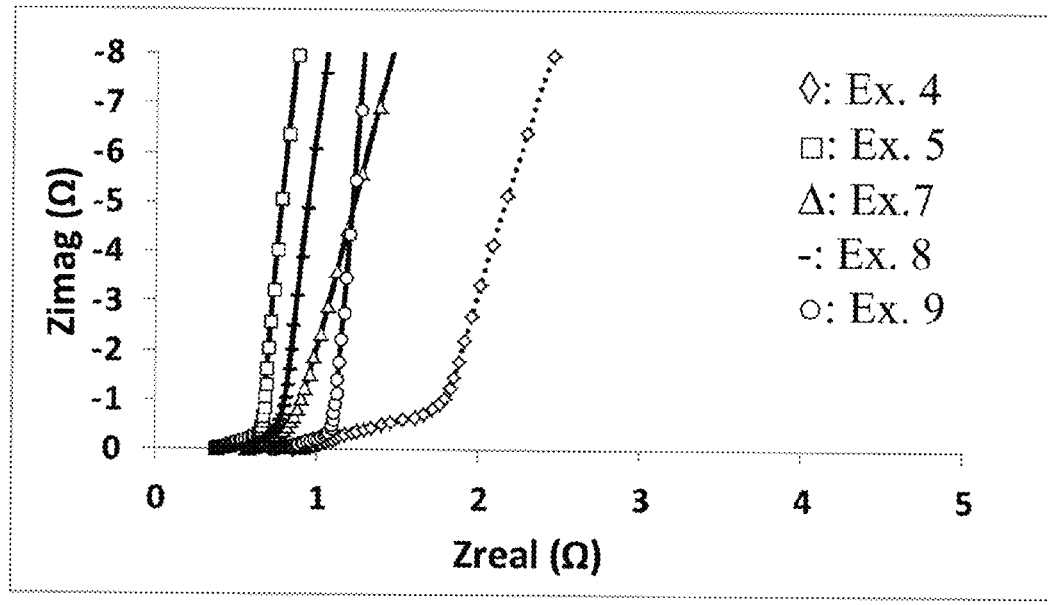
FIG. 6 shows Nyquist plots for coin cells comprising carbon-based electrodes at 0V.
Figure 7:
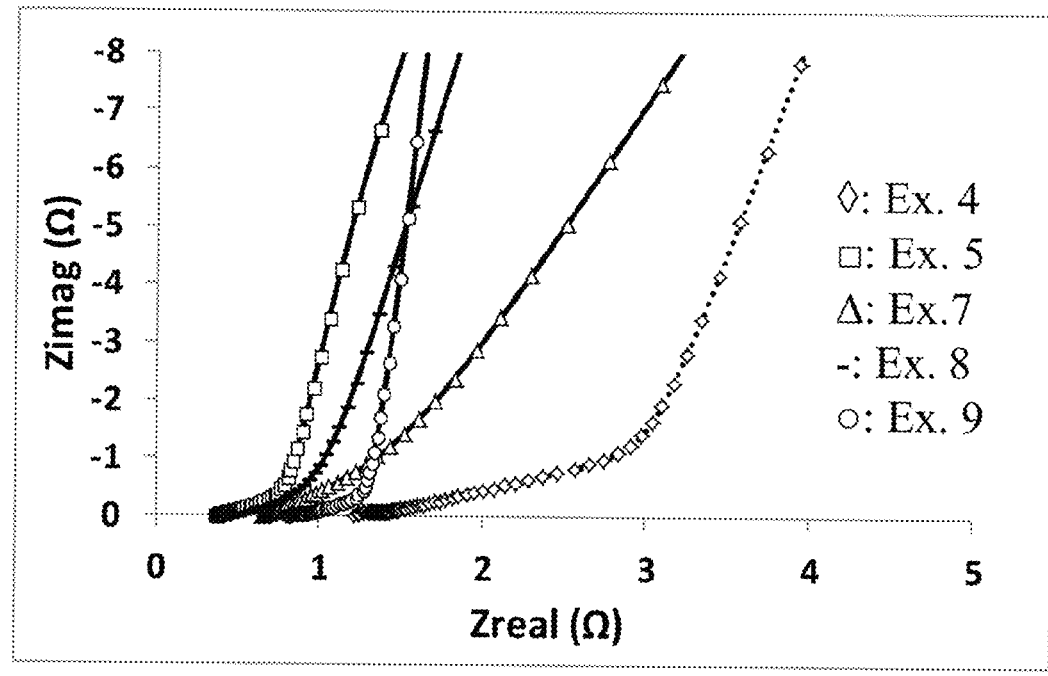
FIG. 7 shows Nyquist plots for coin cells comprising carbon-based electrodes at 2.7V.
Figure 8:
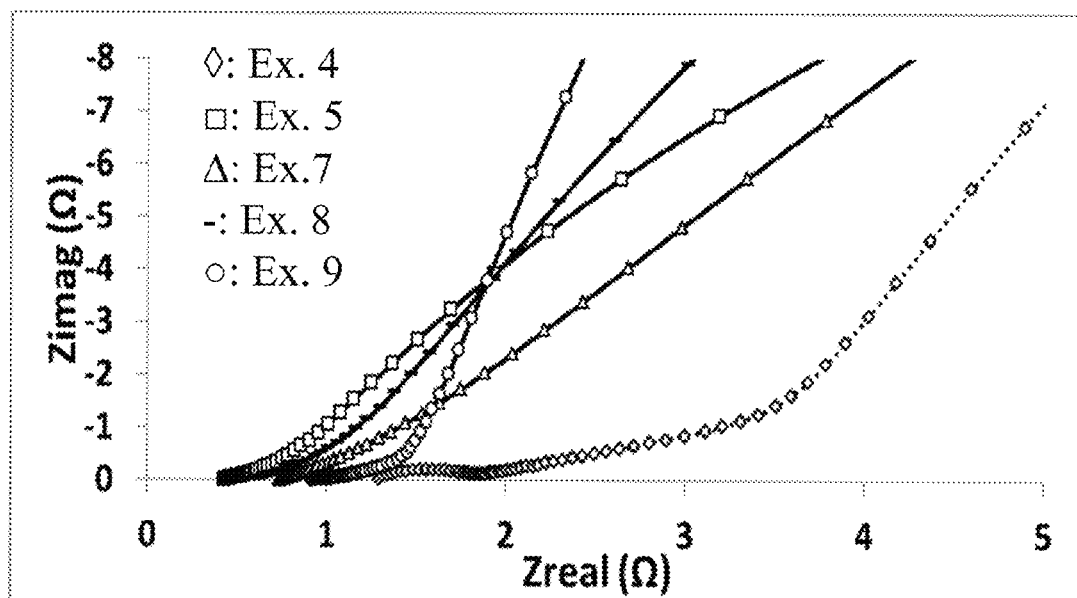
FIG. 8 shows Nyquist plots for coin cells comprising carbon-based electrodes at 3V.

ESR plots for Examples 4, 5 and 7-9 at 0V, 2.7V and 3V are shown respectively in FIGS. 6-8.

In embodiments, a 1-10 wt. % (e.g., 2-5 wt. %) solution of sodium napthalenide/2-methoxyethyl ether may be used to pre-treat a current collector surface prior to forming a carbon mat on the surface.

Disclosed are carbon-based electrodes and associated methods for making carbon-based electrodes that can be incorporated into high energy, high power performance EDLC devices. Various embodiments relate to incorporation of high molecular weight Kynar® grade polyvinylidene (PVDF) binder into the carbon mat. Further embodiments relate to providing a binder-less conductive carbon coating (e.g., thermally-grown carbon) at the interface between the carbon mat and the current collector and the pre-treatment of such a carbon coating with sodium napthalenide/2-methoxyethyl ether to promote adhesion between the carbon mat and the carbon.

As used herein, the singular forms "a," "an" and "the" include plural referents unless the context clearly dictates otherwise. Thus, for example, reference to a "binder" includes examples having two or more such "binder" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an electrode that comprises activated carbon, carbon black and a binder include embodiments where an electrode consists of activated carbon, carbon black and a binder and embodiments where an anode consists essentially of activated carbon, carbon black and a binder.

It will be apparent to those skilled in the art that various modifications and variations can be made to the present disclosure without departing from the spirit and scope of the invention. Since modifications, combinations, sub-combinations and variations of the disclosed embodiments may occur to persons skilled in the art, the invention should be construed to include everything within the scope of the appended claims and their equivalents.

We claim:

1. A method of forming a carbon-based electrode, comprising:
    thermally growing a first conductive layer formed of carbon on at least one major surface of a substrate;
    forming a slurry including activated carbon particles, carbon black particles and binder;
    coating the slurry onto the first conductive layer to form a thin film;
    and drying the thin film to form a carbon mat, wherein the binder comprises a fluoro-polymer having from 40 to 70 wt. % fluorine and a molecular weight of at least 500,000.

2. The method according to claim 1, wherein the coating comprises slot coating.

3. The method according to claim 1, wherein the thin film is formed over both major surfaces of the substrate.

4. The method according to claim 1, wherein the substrate comprises a current collector having opposing first and second major surfaces, a second conductive layer comprising thermally-grown carbon formed over the second major surface, and the slurry is coated onto each respective thermally-grown carbon layer.

5. The method according to claim 4, wherein the first and second conductive layers each have an organic content of less than 0.5 wt. %.

6. The method according to claim 1, further comprising laminating, the carbon mat onto the substrate.

7. The method according to claim 1, further comprising applying an alkali metal napthalenide-based solution to the substrate prior to the coating, wherein the alkali metal is selected from the group consisting of lithium, sodium, and potassium.

8. The method according to claim 7, wherein the solution comprises 1 to 10% wt. % sodium napthalenide.

\* \* \* \* \*